Sept. 20, 1927.

T. J. FAY 1,642,946

VEHICLE

Filed Feb. 19, 1924    6 Sheets-Sheet 1

INVENTOR.
THOMAS J. FAY

BY
Stockbridge & Borst
ATTORNEYS

Sept. 20, 1927.

T. J. FAY

VEHICLE

Filed Feb. 19, 1924

INVENTOR.
THOMAS J. FAY

BY Stockbridge & Borst
ATTORNEYS

Sept. 20, 1927.

T. J. FAY

VEHICLE

Filed Feb. 19, 1924

INVENTOR.
THOMAS J. FAY
BY
Stockbridge & Borst,
ATTORNEYS

Patented Sept. 20, 1927.

1,642,946

UNITED STATES PATENT OFFICE.

THOMAS J. FAY, OF BROOKLYN, NEW YORK.

VEHICLE.

Application filed February 19, 1924. Serial No. 693,860.

This invention relates to vehicles and has for an object to provide an improved suspension between the chassis frame and axle which will greatly improve the riding qualities of the vehicle regardless of the roughness of the roadway over which the vehicle travels. A further object is to provide improved means for controlling and modifying the relative movements of the chassis frame and axle, which are caused by the unevenness of the roadway over which the vehicle is passing, so that violent, sudden or excessive relative movements of the frame and axle will be prevented, regardless of the degree of unevenness of the roadway or the speed of the vehicle and such movements as do occur will be slow and easy. A further object is to provide an improved construction for accomplishing the above objects, which will be relatively simple, inexpensive and readily applicable to existing types of vehicle constructions without material changes in their design and construction. Other objects and advantages will be apparent from the following description of an embodiment of the invention, and the novel features will be particularly pointed out in the appended claims.

Figure 1:
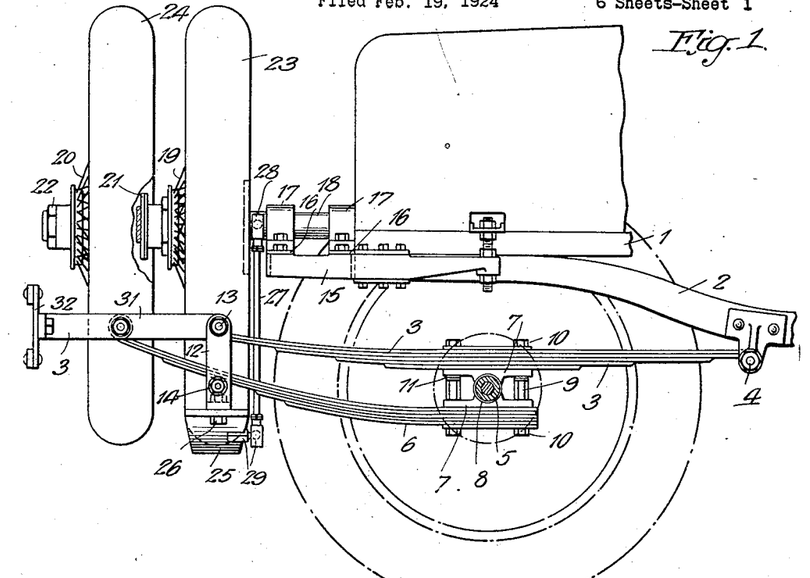
Fig. 1 is a side elevation, partly in section, of the rear end of a vehicle constructed in accordance with the invention.
Figure 2:
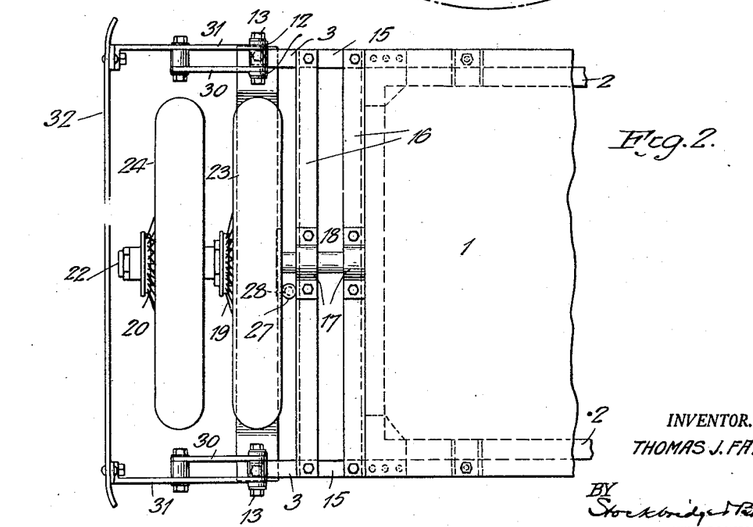
Fig. 2 is a plan of the same.

Referring particularly to Figs. 1 and 2, the body 1 of the vehicle is secured in any suitable manner to the chassis frame 2, and on each side of the vehicle a suspension member 3 is articularly connected at one end by a pivot pin 4 to the chassis frame, and at an intermediate point to the rear axle casing 5. A second suspension member 6 is secured to the axle housing 5, preferably upon the side opposite from the member 3, and extends rearwardly of the vehicle beneath the other end of the member 3, but a slightly further distance from the axle housing.

A pair of bearing blocks 7 are caused to embrace the axle housing, with a friction fabric or member 8 between the bearing blocks and the axle housing. Bolts 9 having heads intermediate their ends are passed through the bearing blocks with the heads between the blocks, and with the threaded ends of the bolts passing through the suspension members 3 and 6, or clamping plates therefor. Suitable nuts 10 may be provided upon the outer ends of the bolts for clamping the suspension members to the bearing blocks and confining the latter to the axle housing. Suitable spacing washers 11 may be interposed between the heads of the bolts 9 and one or both of the bearing blocks so as to determine the tightness with which the bearing blocks may grip the axle housing.

The tightness is preferably such that suitable friction will be created between the bearing block and the axle housing by reason of the friction fabric or lining 8.

Gathering plates 12 are connected by bolts 13 to opposite sides of each suspension member 3, and by bolts 14 to opposite sides of the suspension member 6 which is in superimposed relation with the suspension member 3, the connection to the suspension member 6 being intermediate of its ends as shown in Fig. 1. The bolts 13 and 14 are spaced apart so that the members 3 and 6 must be sprung together somewhat at their free ends when they are coupled.

Arms 15 are secured to opposite sides of the chassis frame so as to extend endwise therefrom. These arms are connected by cross members or plates 16 which, intermediate of their ends or supports, support suitable aligned bearing blocks 17 for a shaft 18. The shaft 18 extends in a direction endwise of the vehicle, and rotatably mounts a pair of pneumatic tire carriers 19 and 20 with a frictional connection 21 between them. The extent of the frictional driving connection between the tire carriers may be varied in any suitable manner such as by tightening of a nut 22 upon the extreme free end of the shaft 18.

Both tire carriers preferably carry pneumatic tires 23 and 24, which may advantageously be spare tires of the vehicles, so that they may be interchanged with the tires upon the wheels of the vehicle in case of punctures of the tires in use. The pneumatic tires may be of the usual type, but I have found that the type of tire commonly known as the "balloon" tire, which has a large air chamber and operates at a relatively low air pressure, is particularly suitable and desirable for use upon the tire carriers, particularly for the tire 23 as will be explained hereinafter.

An abutment member 25 in the nature of a strip or bar is connected by bolts 26 to the lower ends of the gathering plates 12 at opposite sides of the vehicle, so as to extend from side to side of the vehicle beneath one of the spare tires such as 23. The tire 23 rests upon the upper face of the abutment member 25, and resists the approach of the chassis frame in action, so that it forms a part of the suspension between the frame and the axle. The upper face of the abutment member against which the tire presses is preferably made arcuately concave, with the tire extending into the concavity. The radius of curvature of the concave surface is preferably larger than the radius of curvature of the tire periphery so that the tire periphery and concave surface of the bar diverge on each side of the point of contact between them.

A connecting rod 27 is connected at one end by a universal connection to a pin 28 which is connected to the tire carrier 19 and disposed eccentrically of the axis of rotation of the carrier, and at its other end it has a universal connection to a pin 29 which is carried by the abutment member 25 intermediate of its ends. The connecting rod and its connections between the abutment member and the tire carrier act in the manner of a crank shaft, so that as the chassis frame and axle approach one another the connecting rod will exert a rotary torque upon the tire carrier. The extreme free or rear ends of the suspension members 3 and 6 are connected by strips 30 and 31, and at least one of these members, such as 31, at each side of the vehicle is extended rearwardly sufficiently to support a bumper 32 extending transversely of the vehicle in a position to protect the vehicle from end-on collisions.

With a vehicle constructed in this manner, the body and chassis frame will be supported at the inner or front ends of the suspension members 3 and at the abutment member 25 against which the tire 23 bears. As the vehicle travels over a roadway, the chassis frame and axle will partake of relative approaching and separating movements. As the chassis moves downwardly relatively to the axle it will, by reason of its connection to the forward ends of the suspension members 3, tend to rock the suspension members about the axle in a direction to cause the abutment to press upwardly upon the tire 23, and at the same time the chassis frame will press the tire downwardly against the abutment member to resist this rocking tendency. The resiliency of the inflated pneumatic tire 23 will thus be effective in holding the chassis frame and axle separated and resiliently permitting relative movements to occur between them. If the suspension members 3 and 6 are substantially non-flexible, the force tending to cause the frame and axle to approach will be largely resisted and overcome by the abutment member and the tire, and if the members 3 and 6 are either or both somewhat flexible, these members will resiliently oppose the relative movements, and that to some extent will relieve the tire of the resistance to the relative approach of the axle and frame.

When the chassis frame moves downwardly, relatively to the axle, the connecting rod 27 will, by reason of its eccentric connection to the tire carrier, exert a rotary torque upon the tire carrier, but inasmuch as the tire is in contact with the abutment member 6, the rotary torque will be transmitted to the tire where it will be resisted and overcome, although in some cases there may be slippage of the tire over the surface of the abutment member. The inertia of the tire carrier and tire, and also the resilient resistance of the tire to the turning torque in case of non-slippage of the tire upon the surface of the abutment member, will also tend to resist the approach of the chassis frame to the axle. In addition the tire carrier 20 and its tire 24 will act as an inertia drag, through the frictional connection 21, upon the carrier 19 for further resisting the relative approach between the axle and the chassis frame.

When the axle and chassis frame separate, the tire carriers and tires will afford a similar resistance to the separation, and in case the separation is very extensive, the connecting rod 27 will positively limit the separation as the pin 28 moves into alignment with the connecting rod and the axis of rotation of the carrier. The action of the crank becomes increasingly effective as the crank approaches a so-called dead center, that is, straightens out.

It has been found that the tire 23 rarely moves out of contact with the abutment member 25, and that this combination of elements effectively irons out, controls or modifies the relative movements between the chassis frame and axle so that the movements of the chassis frame will be smooth, moderate, and not violent or excessive, regardless of the speed of the vehicle or the unevenness of the roadway. Where a pneumatic device alone is utilized for resisting the relative movements of the frame and axle there is a pronounced frequently violent rebound and a suppressed tendency to a continuance of the rebounds, but with the crank connection and the frictional drag I have found that the disadvantage of the rebound of the pneumatic resistance to the relative movements of the frame and axle will be overcome or limited, and the riding qualities of the vehicle will be very considerably improved over any existing suspensions.

By reason of the greater radius of curvature of the arcuate concave surface of the abutment member, relatively to the radius of curvature of the outer periphery of the tire, when one side of the axle moves vertically to a greater extent than the other, the arcuate concave portion of the abutment will rock about the center of curvature of the tire so as not to compress the tire to any greater extent, unless the relative movement of the axle is of considerable magnitude. When the chassis frame careens sidewise, the lateral walls of the concavity will resist it, if the careening tendency becomes relatively great. The resistance to the careening will be proportional to the angle the normal to the tire at the point of contact makes with the horizontal, and since the normal approaches the horizontal as the careening increases in extent, the resistance will become greater proportionally to the increases in extent of careening.

Figure 3:
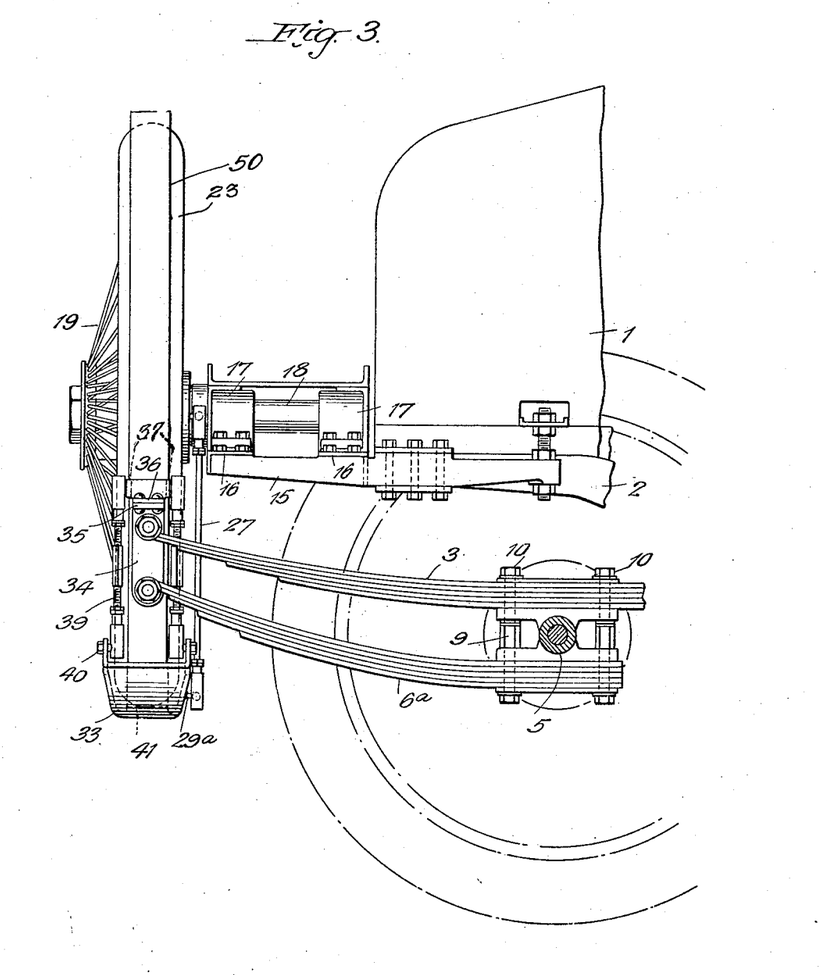
Fig. 3 is a side elevation, partly in section, of the rear end of a vehicle, also constructed in accordance with the invention but illustrating a further modification thereof.
Figure 4:
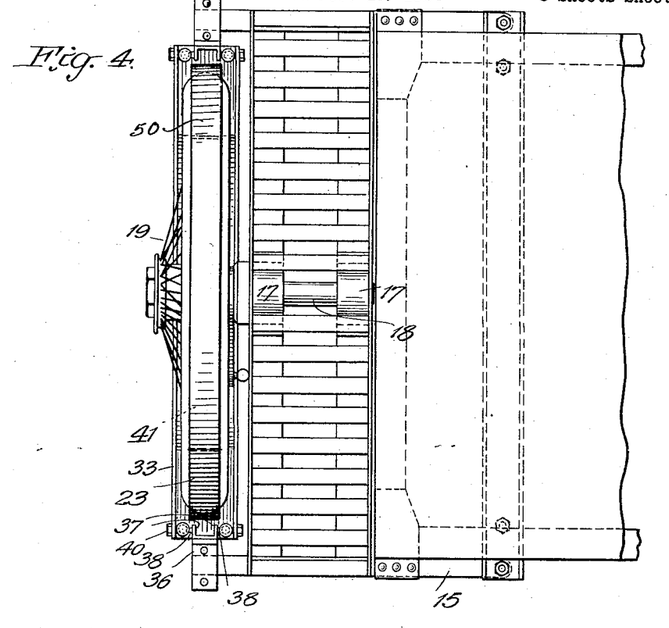
Fig. 4 is a plan of the same.
Figure 5:
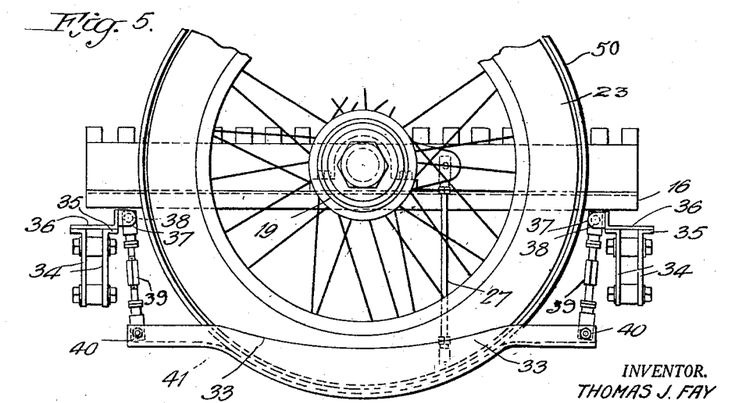
Fig. 5 is an end elevation of the same.

In Figs. 3, 4 and 5, the extra tire carrier and tire have been omitted and the abutment member 33, corresponding to the abutment 25 of the preceding figures, is suspended at its ends from the suspension members 3ª and 6ª, corresponding generally to the members 3 and 6 of Figs. 1 and 2. The gathering plates 34, similar to the gathering plates 12, are provided at their upper ends with flanges 35, and a plate 36 is secured to the flanges. The plate 36 is provided with parallel ears 37 which extend transversely of the vehicle and carry pins 38 having universal connections to suspension rods 39. The suspension rods are preferably adjustable in length and at the lower ends have universal connections to pins 40 which are provided upon the abutment member 33. The abutment member therefore is free to sway slightly from side to side. The crank connecting rod 27 is universally connected at its lower end to pin 29ª provided upon the abutment member 33 so as to resist relative movements between the frame and axle in the manner described in connection with the preceding figures.

In many cases the relative movement between the frame and axle will be largely at one side or the other, not in both, and in such cases the abutment member 33 will rock or swing upon the periphery with the tire and one end of the abutment will move toward the frame more than the other. By reason of the swinging connection, the pressure between the abutment member and the tire will be substantially radially of the tire. The action of this embodiment of the invention is otherwise similar to that described in connection with Figs. 1 and 2. It will be understood, of course, that the extra tire and its carrier acting as a drag upon the carrier 19 may be utilized in this embodiment if desired, but it has been omitted in the interest of brevity and to illustrate that very satisfactory results may be obtained without the frictional drag. If desired a frictional tread 41 may be provided upon the upper surfaces of the abutment member with which the tire periphery engages so as to increase the frictional contact between the abutment member and tire.

Figure 6:
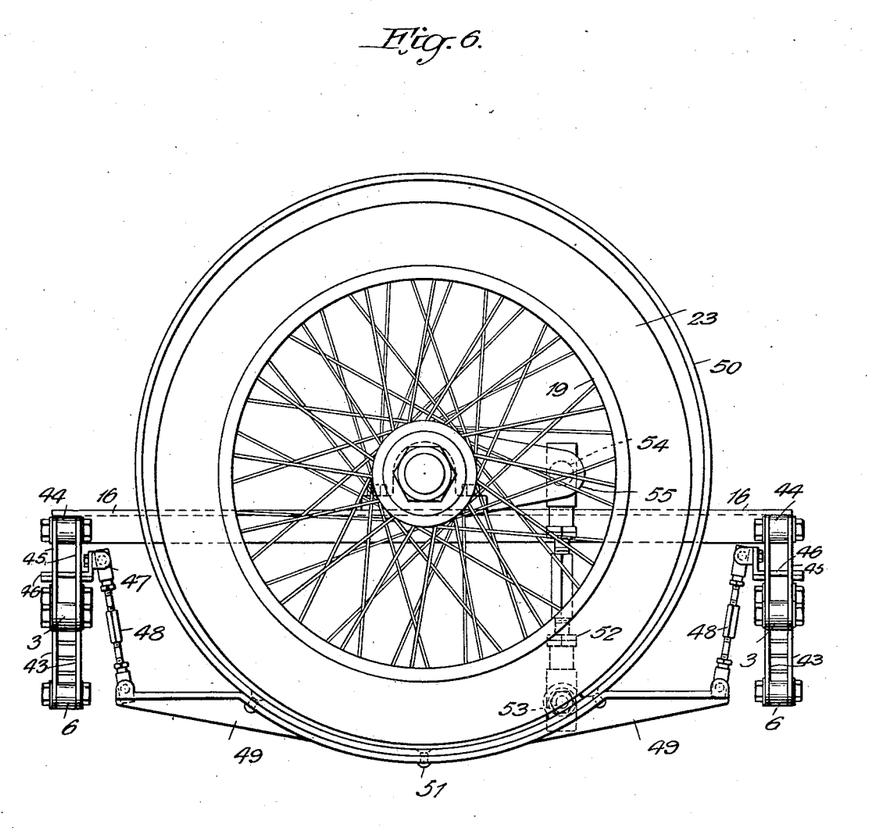
Fig. 6 is an end elevation of a suspension between a chassis frame and axle, also constructed in accordance with the invention but illustrating a further modification thereof.
Figure 7:
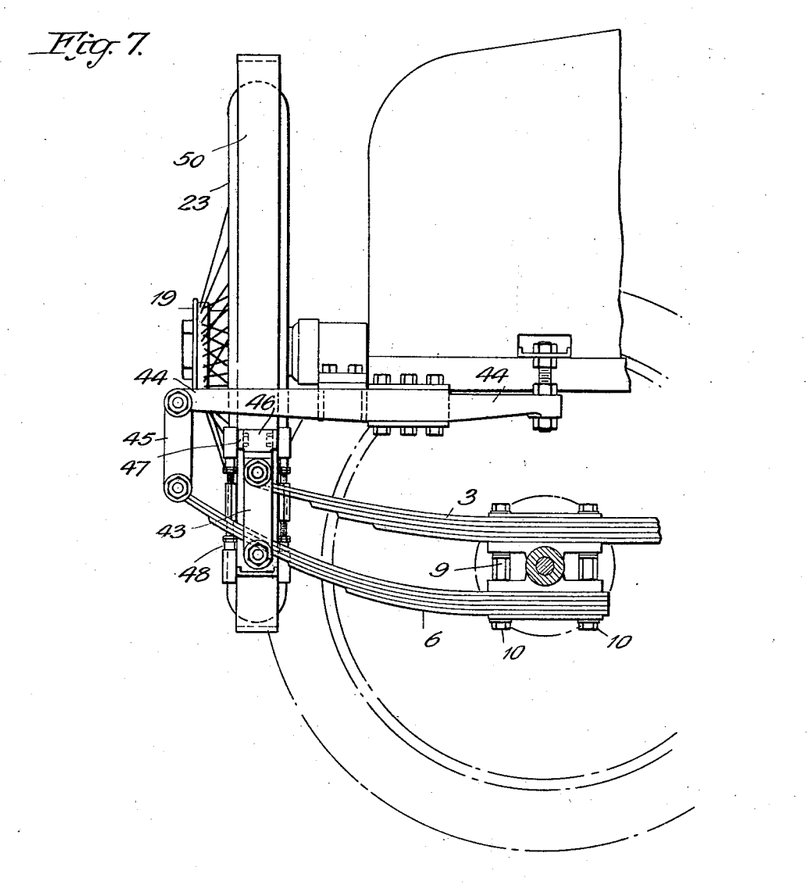
Fig. 7 is a side elevation of the same.

In Figs. 6 and 7 another embodiment of the invention is illustrated. The suspension members 3 and 6, which are similar to the correspondingly numbered members in Figs. 1 and 2, are connected together under stress toward one another by the gathering plates 43, in the same manner that these members are connected by the plates 12 in Figs. 1 and 2. Arms 44 are secured to the side of the chassis frame in any suitable manner, and extend rearwardly of the vehicle above the suspension members 3 and 6. Each arm 44 at its rear end is connected by links 45 to the extreme rear end of the member 6 below it, so that the chassis frame will be supported entirely upon the axle through the suspension members 3 and 6, which may be composed of leaf springs, as usual in the spring suspensions of vehicles.

Plates 46 are connected to the gathering plates 43 at each side of the vehicle and have parallel ears 47 extending transversely of the vehicle. Suspension links 48 are hinged to the ears 47 for movement transversely of the vehicle, and at their lower ends are hinged to an abutment member 49 which extends transversely of the vehicle beneath the pneumatic tire 23.

A closed band 50 is secured in any suitable manner, such as by rivets 51, to the abutment member 49 and surrounds the periphery of the tire 23. The band 50 is slightly larger in diameter than the outside diameter of the tire so as to provide a small clearance between them. The links 48 are adjustable in length so that the band 50 may be given any desired spacing relatively to the tire 23 for any selected loading of the vehicle. The spacing is preferably such as shown in Figs. 6 and 7.

A crank connecting rod 52 is hinged by a pin 53 to the abutment member 49 and by a pin 54 to a crank arm 55 carried by the tire carrier 19, so that as the chassis frame and axle partake of relative vertical movements the tire carrier and tire will be oscillated. With this construction the minor shocks and vibrations produced as the vehicle traverses a roadway, will be taken up by the usual spring suspension elements 3 and 6 and the relative movements produced between the frame and axle will be modified or controlled to some extent by the inertia of the tire and carrier. It will be noted that with this crank connection, the vertical movements of the chassis frame relative to the axle will be checked, controlled, and modified by the inertia of the tire, its carrier and the connecting rod.

In case of the major relative movements of the chassis frame, relatively to the axle, which are beyond the control of the inertia parts just mentioned, the closed band will be engaged by the tire, and the resiliency of the inflated pneumatic tire will then become effective to cushion and resiliently check the vertical movements of the chassis frame. The tendency to rebound, by reason of the pneumatic cushion, will be controlled and modified by the concomitant action of the inertia of the tire and carrier, so that such movements of the chassis frame as occur will be relatively smooth and slow. The swinging of the abutment member from side to side to some extent will enable a limited movement of each side of the axle relatively to the chassis frame without materially affecting the chassis frame unless the movement is considerable, in which case the action will be checked in the manner described.

Figure 8:
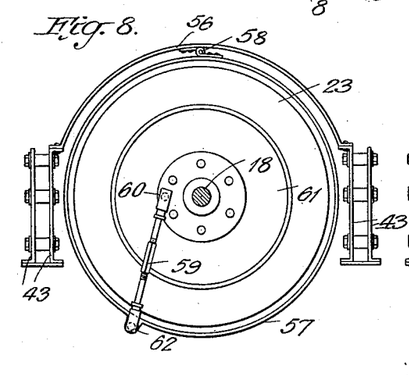
Fig. 8 is a diagram somewhat similar to Fig. 6, but illustrating a further modification of the invention.

In Fig. 8 the construction is similar to that of Figs. 6 and 7, except that an arch member 56 extends between and connects the gathering plates 43 at opposite sides of the vehicle, the member 56, passing over the tire 23. A closed band 57 surrounds the tire 23 and is hinged at 58 to the central part of the member 56. A crank connecting rod 59 is connected by a pin 60 to the tire carrier 61 and by a pin 62 to a suitable part of the closed band 57. The action of this construction is very similar to that of Figs 6 and 7, in that the closed band 57 limits the major movements of the chassis frame relatively to the axle, and by the crank connection between the tire carrier and the band, the relative movements of the frame and axle will be rendered smooth and checked. The closed band 57 is free somewhat to swing from side to side, so that the minor movements of one end of each axle without corresponding movements at the other end will not materially affect the chassis frame.

Figure 9:
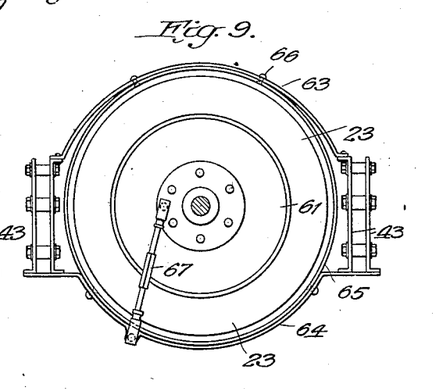
Fig. 9 is a similar diagram, but illustrating still another modification of the invention.

In Fig. 9 in addition to the bridge member 63, which corresponds to bridge 56 of Fig. 8, a second member 64 connects the gathering plates at opposite sides of the vehicle, and extends below the tire 23. A closed band 65 is rigidly secured, such as by rivets 66, to the upper and lower members 63 and 64 and surrounds the tire for limiting its vertical migrations. A connecting rod 67, similar to the connecting rod 59 of Fig. 8 is connected between the tire carrier and one of the cross members 63 or 64. The action of this construction is very similar to that of Fig. 8, except that there will be no movement of the closed band transversely of the vehicle.

Figures 10, 11, 12:
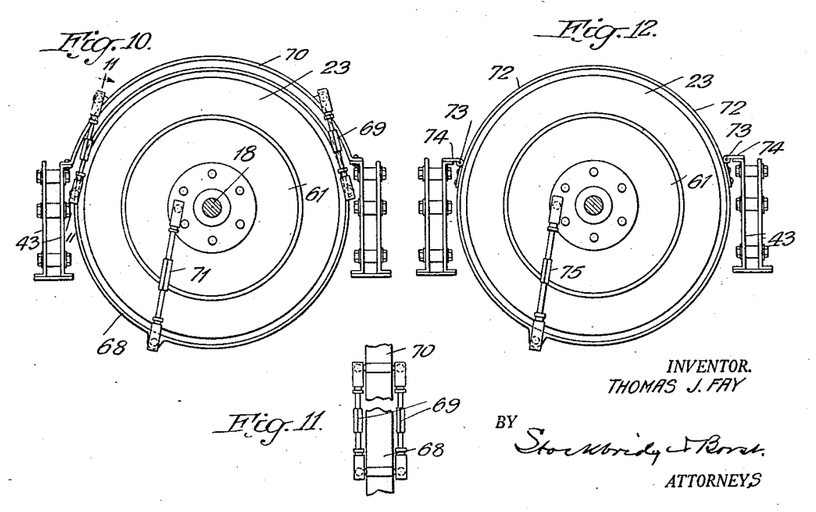
Fig. 10 is a similar diagram illustrating still another modification of the invention.
Fig. 11 is a sectional elevation of a portion of the structure shown in Fig. 10, the section being taken substantially along the line 11—11 of Fig. 10.
Fig. 12 is another diagram illustrating still another modification of the invention.

In Figs. 10 and 11 the closed band 68 is suspended by swinging links 69 from an arch strip 70 corresponding to the arch member 56 of Fig. 8. The band 68 is connected by the crank connecting rod 71 to the carrier 61 for the same purpose as in Fig. 8.

In Fig. 12 a closed band 72 is hinged at opposite sides as at 73 to anchorage plates 74 which are secured to the gathering plates 43. In this construction the band surrounds the tire and limits its migrations, and the connecting rod 75 connects the band with the carriers 61, as explained in connection with the preceding figures.

Figure 13:
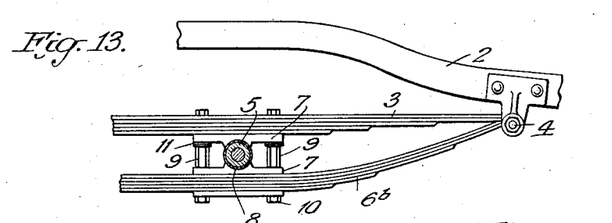
Fig. 13 is a sectional elevation through a portion of a vehicle showing a slight modification in the construction illustrated in Figs. 1 and 2.

In case it is desired to have a more rigid suspension between the axle and the connecting pin 4, in the embodiment shown in Figs. 1 and 2, the suspension members $6^b$, (see Fig. 13) corresponding to the members 6 of Fig. 1, will be extended forwardly and also hinged to the pin 4 carried by the chassis frame. In this construction, since the suspension members 3 and $6^b$ at each side of the vehicle are positively connected together at their forward and rear ends, and also at their connection to the axle housing 5 the members will act as trusses and will be comparatively rigid. The result is that the members will act more or less as a lever and the resistance to the relative movements of the frame and axle will be offered largely, if not entirely, by the pneumatic tire and the crank connections and frictional drags as before explained.

In all of the embodiments herein described and illustrated, the suspension members are each connected at one end directly to the chassis frame, and at an intermediate point rockable upon the axle housing. The frictional connection between the axle housing and suspension members will tend to retard the rocking of the suspension members and thereby retard relative movements of the frame and axle. Various attempts have heretofore been made to utilize friction and pneumatic devices for controlling the relative movements between the chassis frame and axle, but they have not separately been successful owing to the tendency of pneumatic devices to cause rebounds with resulting continuous oscillations and the undesirable continuous resistance by the friction device.

In the various embodiments which have been hereinbefore described a part or all of the following features will be active in the controlling of the relative movements between the frame and axle.

1. The resiliency of the elastic fluid confined within the tire 23.
2. The resistance of the tire to tangential forces caused by the crank device when the tire is in contact with the abutment.
3. The friction existing between the tire and abutment member when they are in contact and the crank device exerts a rotary torque upon the tire and its carrier.
4. The pressure producing rotation of the suspension members 3 and 6 about the axle which is resisted by the fabric 8 at the connection of the suspension members to the axle.
5. The resiliency of the suspension member 3 between its respective connections to the axle and frame.
6. The inertia of the carrier 19 and the tire 23.
7. The frictional drag of the extra inertia member 20 and the tire carried thereby.

It will be noted that by reason of the clamping of the members 3 and 6 to the bearing blocks 7 and the connection together of their free ends by the gathering plates 12 and the members 30 and 31, a truss member is provided which is substantially rigid especially in comparison with the portion of the member 3 between the axle and pivot 4 which is resiliently flexible. When the chassis frame approaches the axle, the tire 23 will press against the abutment member and through it press downwardly upon the substantially rigid end of the suspension means at each side of the vehicle tending to rotate the suspension elements in a direction to force the flexible arm upwardly and resiliently oppose the downward movement of the frame. This rocking of the suspension elements will be resisted by the friction between the suspension elements and the axle housing. This use of the motion of the frame to actuate the lever to stop this movement contributes considerably to the proper control to the migration of the chassis frame. Where the suspension members or elements are flexible upon both sides of the axle such rocking movement will not occur because the ends of the suspension members will merely flex and no rocking movement will occur. It will therefore be obvious that by causing a rocking movement to occur this movement may be further controlled by suitable means such as the friction at the axle.

I have found by experience that by combining the pneumatic control with a frictional control and also with an inertia control, a close approach to a perfect suspension may be obtained. The advantages of all of the combined features are obtained, and each modifies the action of the others so that when properly proportioned, a vehicle constructed with these features may be driven at any speed over any kind of a roadway without producing sudden or marked jouncings, or rapid or extreme vertical migrations of the chassis frame. Such a vehicle rides very smoothly and comfortably regardless of the character of the roadway or speed of the vehicle.

While I have disclosed the improved suspension as applied to the rear end of a vehicle, it will be understood that it may be also applied to the forward end of the vehicle if desired.

It will be obvious that various changes in the details and arrangements of the parts, which have been herein described and illustrated for the purpose of explaining the nature of the invention, may be made by those skilled in the art within the principle and scope of the invention as defined in the appended claims.

I claim:

1. In a vehicle having a chassis frame and axle, a suspension element connected to the chassis frame, and to the axle, and a pneumatic tire of the balloon type interposed intermediate the articulating faces of the element and the chassis frame for modifying their relative approach.

2. In a vehicle having a chassis frame and axle, a suspension element at each side of the vehicle, each connected at one end to the chassis frame, and at an intermediate point to the axle, an abutment member extending across the vehicle and hingedly connected to the said elements at opposite sides of the vehicle to permit crosswise motion thereof, an inflated pneumatic tire, a carrier for said tire supported upon said frame, with the tire engageable with the abutment member to resist approach of the axle and frame, the surface of the abutment member against which the tire acts being concave with the tire entering the concavity.

3. In a vehicle having a chassis frame and axle, a suspension element at each side of the vehicle, each connected at one end to the chassis frame, and at an intermediate point to the axle, an abutment member extending across the vehicle and hingedly connected to the said elements at opposite sides of the vehicle to permit crosswise motion thereof, an inflated pneumatic tire, a carrier for the said tire supported upon said frame, with the tire engageable with the abutment member to resist approach of the axle and frame, the surface of the abutment member against which the tire acts being arcuately concave with the tire entering the concavity, the radius of curvature of the concave surface being greater than the radius of curvature of the tire periphery.

4. In a vehicle having a chassis frame and axle, a suspension element at each side of the vehicle, each connected at one end to the chassis frame, and at an intermediate point to the axle, an abutment member extending across the vehicle and hingedly connected to the said elements at opposite sides of the vehicle to permit crosswise motion thereof, an inflated pneumatic tire, a carrier for said tire rotatably supported upon said frame with the tire engageable with the abutment member to resist approach of the axle and frame, the surface of the abutment member against which the tire acts being arcuately concave with the tire entering the concavity, and means operative upon relative movement between the frame and axle, for exerting a rotary torque upon the tire and carrier.

5. In a vehicle having a chassis frame and axle, a suspension element connected at one end to the frame and at an intermediate portion rockably connected to the axle, the element between its connections to the axle and frame being resiliently flexible; and between its connection to the axle and its other end being substantially rigid, and a pneumatic device interposed between the rigid arm and the frame.

6. In a vehicle having a chassis frame and axle, means interposed between the frame and axle for controlling relative movement therebetween and including an inflated pneumatic balloon type tire and an abutment member, the tire when pressing against the abutment member resiliently resisting relative movement of the frame and axle.

7. In a vehicle having a chassis frame and axle, means connecting the chassis frame and axle and including an element supported from the axle for swinging horizontal movement, and an inflated pneumatic tire supported by the chassis frame and engageable with said swinging element upon relative approach of said frame and axle.

8. In a vehicle having a chassis frame and axle, a suspension element at each side of the vehicle, each connected at one end to the chassis frame and at an intermediate point to the axle, an abutment element extending transversely of the vehicle between said suspension elements, and links hingedly connecting said abutment element to the other ends of said suspension elements, with the links extending approximately vertical, whereby said abutment element may swing laterally to a limited extent, said abutment element having a transversely extending concave abutment surface, and an inflated pneumatic tire carried by the chassis frame and engageable with said concave surface to resiliently limit the relative movement of said frame and axle.

9. In a vehicle having a chassis frame and axle, an abutment member suspended from the axle and capable of limited swinging movement laterally of the vehicle, said member having an arcuate intermediate portion extending lengthwise thereof, and an inflated pneumatic tire carried by the frame and engageable within said arcuate portion to limit the relative movements of said frame and axle.

10. In a vehicle having a chassis frame and axle, an inflated pneumatic tire carried by said frame, means encircling said tire and supported from the axle for limiting the relative movements of said frame and axle, and thereby limiting the relative movements of the frame and axle in all directions, said means including a hoop supported from the axle for lateral swinging movement.

11. In a vehicle having a chassis frame and axle, an inflated pneumatic tire supported on said frame so as to extend laterally of the vehicle, members connecting the axle and frame at each side of the vehicle, and an element hingedly connected to said members for swinging movement laterally of the vehicle and including a band encircling the periphery of the tire for engagement with the tire periphery to limit the relative movements of the frame and axle.

12. In a vehicle having a chassis frame and axle, an inflated pneumatic tire supported on said frame so as to extend laterally of the vehicle, members connecting the axle and frame at each side of the vehicle, and an element hingedly connected to said members for swinging movement laterally of the vehicle and including a band encircling the periphery of the tire for engagement with the tire periphery to limit the relative movements of the frame and axle, and means connected between said element and the tire for imparting rotary movements to said tire upon relative movements of said axle and frame.

In witness whereof, I hereunto subscribe my signature.

THOMAS J. FAY.